United States Patent
Cook et al.

(10) Patent No.: US 9,106,527 B1
(45) Date of Patent: Aug. 11, 2015

(54) HIERARCHICAL RESOURCE GROUPS FOR PROVIDING SEGREGATED MANAGEMENT ACCESS TO A DISTRIBUTED SWITCH

(75) Inventors: Dana Cook, Deerfield, NH (US); Chris Cole, Topsfield, MA (US); David Nedde, Andover, MA (US); Ashley Saulsbury, Los Gatos, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 474 days.

(21) Appl. No.: 12/976,191

(22) Filed: Dec. 22, 2010
(Under 37 CFR 1.47)

(51) Int. Cl.
*H04L 12/24* (2006.01)

(52) U.S. Cl.
CPC ............ *H04L 41/08* (2013.01); *H04L 41/0803* (2013.01); *H04L 41/082* (2013.01); *H04L 41/0806* (2013.01); *H04L 41/0813* (2013.01); *H04L 41/0816* (2013.01)

(58) Field of Classification Search
None
See application file for complete search history.

(56) References Cited

U.S. PATENT DOCUMENTS

| | | | |
|---|---|---|---|
| 5,138,615 A | | 8/1992 | Lamport et al. |
| 5,751,967 A | * | 5/1998 | Raab et al. ............... 709/228 |
| 5,801,641 A | | 9/1998 | Yang et al. |
| 5,825,772 A | * | 10/1998 | Dobbins et al. ............... 370/396 |
| 5,913,921 A | | 6/1999 | Tosey et al. |
| 5,926,473 A | | 7/1999 | Gridley |
| 5,987,028 A | | 11/1999 | Yang et al. |
| 6,075,773 A | | 6/2000 | Clark et al. |
| 6,212,183 B1 | | 4/2001 | Wilford |
| 6,246,692 B1 | | 6/2001 | Dai et al. |
| 6,385,198 B1 | | 5/2002 | Ofek et al. |
| 6,393,026 B1 | | 5/2002 | Irwin |
| 6,553,028 B1 | | 4/2003 | Tang et al. |
| 6,609,153 B1 | | 8/2003 | Salkewicz |
| 6,639,910 B1 | | 10/2003 | Provencher et al. |
| 6,654,373 B1 | | 11/2003 | Maher, II et al. |
| 6,658,481 B1 | | 12/2003 | Basso et al. |
| 6,684,241 B1 | * | 1/2004 | Sandick et al. ............... 709/220 |
| 6,816,486 B1 | | 11/2004 | Rogers |
| 6,823,454 B1 | | 11/2004 | Hind et al. |

(Continued)

FOREIGN PATENT DOCUMENTS

| | | |
|---|---|---|
| EP | 1 318 628 A1 | 6/2003 |
| EP | 1 758 320 A1 | 2/2007 |

(Continued)

OTHER PUBLICATIONS

U.S. Appl. No. 12/345,498, filed Dec. 29, 2008, entitled "Control Plane Architecture for Switch Fabrics".

(Continued)

*Primary Examiner* — Ayaz Sheikh
*Assistant Examiner* — Peter Chau
(74) *Attorney, Agent, or Firm* — Cooley LLP

(57) ABSTRACT

In one embodiment, an apparatus includes a network management module configured to execute at a network device operatively coupled to a switch fabric. The network management module is configured to receive a first set of configuration information associated with a subset of network resources from a set of network resources, the set of network resources being included in a virtual local area network from a plurality of virtual local area networks, the plurality of virtual local area networks being defined within the switch fabric. The first set of configuration information dynamically includes at least a second set of configuration information associated with the set of network resources.

10 Claims, 7 Drawing Sheets

(56) References Cited

U.S. PATENT DOCUMENTS

| | | | |
|---|---|---|---|
| 6,856,620 B1 | 2/2005 | Dunsmore et al. | |
| 6,865,673 B1 | 3/2005 | Nessett et al. | |
| 6,868,082 B1 | 3/2005 | Allen, Jr. et al. | |
| 6,934,260 B1 | 8/2005 | Kanuri | |
| 7,024,592 B1 | 4/2006 | Voas et al. | |
| 7,173,931 B2 | 2/2007 | Chao et al. | |
| 7,230,947 B1 | 6/2007 | Huber et al. | |
| 7,233,568 B2 | 6/2007 | Goodman et al. | |
| 7,245,629 B1 | 7/2007 | Yip et al. | |
| 7,248,760 B1 | 7/2007 | Corbalis et al. | |
| 7,277,429 B2 | 10/2007 | Norman et al. | |
| 7,289,513 B1 | 10/2007 | Medved et al. | |
| 7,315,897 B1 | 1/2008 | Hardee et al. | |
| 7,330,467 B2 | 2/2008 | Sharma | |
| 7,369,561 B2 | 5/2008 | Wybenga et al. | |
| 7,406,038 B1 | 7/2008 | Oelke et al. | |
| 7,408,927 B2 | 8/2008 | George | |
| 7,415,034 B2 | 8/2008 | Muller et al. | |
| 7,415,627 B1 | 8/2008 | Radhakrishnan et al. | |
| 7,428,219 B2 | 9/2008 | Khosravi | |
| 7,437,469 B2 | 10/2008 | Ellanti et al. | |
| 7,466,703 B1 | 12/2008 | Arunachalam et al. | |
| 7,471,676 B2 | 12/2008 | Wybenga et al. | |
| 7,596,614 B2 | 9/2009 | Saunderson et al. | |
| 7,715,382 B2 | 5/2010 | Lakshman et al. | |
| 7,746,799 B2 | 6/2010 | Kokot et al. | |
| 7,792,993 B1 | 9/2010 | Hopprich et al. | |
| 7,860,097 B1 | 12/2010 | Lovett et al. | |
| 7,877,483 B1 | 1/2011 | Finn | |
| 8,078,777 B2 * | 12/2011 | Staats et al. | 710/64 |
| 8,089,904 B2 | 1/2012 | Balasubramaniam et al. | |
| 8,175,079 B2 | 5/2012 | Alapuranen et al. | |
| 2002/0009078 A1 | 1/2002 | Wilson et al. | |
| 2002/0051450 A1 | 5/2002 | Ganesh et al. | |
| 2003/0023711 A1 * | 1/2003 | Parmar et al. | 709/223 |
| 2003/0039212 A1 | 2/2003 | Lloyd et al. | |
| 2004/0023558 A1 | 2/2004 | Fowler et al. | |
| 2004/0034702 A1 | 2/2004 | He | |
| 2004/0039820 A1 | 2/2004 | Colby et al. | |
| 2004/0064559 A1 | 4/2004 | Kupst et al. | |
| 2004/0076151 A1 | 4/2004 | Fant et al. | |
| 2004/0250117 A1 * | 12/2004 | Congdon | 713/201 |
| 2004/0254909 A1 | 12/2004 | Testa | |
| 2005/0129017 A1 | 6/2005 | Guingo et al. | |
| 2005/0138346 A1 | 6/2005 | Cauthron | |
| 2005/0180438 A1 | 8/2005 | Ko et al. | |
| 2005/0193114 A1 | 9/2005 | Colby et al. | |
| 2005/0232258 A1 | 10/2005 | Wybenga et al. | |
| 2005/0267959 A1 | 12/2005 | Monga et al. | |
| 2006/0005185 A1 | 1/2006 | Nguyen | |
| 2006/0092975 A1 | 5/2006 | Ansari et al. | |
| 2006/0164199 A1 | 7/2006 | Gilde et al. | |
| 2006/0165085 A1 | 7/2006 | Konda | |
| 2006/0187854 A1 * | 8/2006 | Booth et al. | 370/254 |
| 2006/0187855 A1 * | 8/2006 | Booth et al. | 370/254 |
| 2006/0198321 A1 | 9/2006 | Nadeau et al. | |
| 2007/0036178 A1 | 2/2007 | Hares et al. | |
| 2007/0067500 A1 * | 3/2007 | Reyes et al. | 710/8 |
| 2007/0073882 A1 | 3/2007 | Brown et al. | |
| 2007/0115918 A1 | 5/2007 | Bodin et al. | |
| 2007/0136489 A1 | 6/2007 | Temoshenko et al. | |
| 2007/0153462 A1 | 7/2007 | Crippen et al. | |
| 2007/0283045 A1 | 12/2007 | Nguyen et al. | |
| 2008/0031151 A1 | 2/2008 | Williams | |
| 2008/0086768 A1 | 4/2008 | Mirza-Baig | |
| 2008/0089323 A1 | 4/2008 | Elias et al. | |
| 2008/0104278 A1 * | 5/2008 | Ford et al. | 709/250 |
| 2008/0112133 A1 | 5/2008 | Torudbakken et al. | |
| 2008/0126788 A1 | 5/2008 | Kreek et al. | |
| 2008/0130517 A1 * | 6/2008 | Lee et al. | 370/254 |
| 2008/0151863 A1 | 6/2008 | Lawrence et al. | |
| 2008/0165704 A1 | 7/2008 | Marchetti et al. | |
| 2008/0186875 A1 | 8/2008 | Kitani | |
| 2008/0192648 A1 | 8/2008 | Galles | |
| 2008/0214059 A1 | 9/2008 | Rothermel et al. | |
| 2008/0219184 A1 | 9/2008 | Fowler et al. | |
| 2008/0320117 A1 | 12/2008 | Johnsen et al. | |
| 2009/0049191 A1 | 2/2009 | Tolliver | |
| 2009/0109963 A1 | 4/2009 | Tanizawa et al. | |
| 2009/0213779 A1 | 8/2009 | Zhang et al. | |
| 2009/0219830 A1 | 9/2009 | Venner et al. | |
| 2009/0271851 A1 | 10/2009 | Hoppe et al. | |
| 2009/0304010 A1 | 12/2009 | Kurebayashi et al. | |
| 2009/0328024 A1 | 12/2009 | Li et al. | |
| 2010/0002382 A1 | 1/2010 | Aybay et al. | |
| 2010/0002714 A1 | 1/2010 | George et al. | |
| 2010/0091779 A1 | 4/2010 | Juhl et al. | |
| 2010/0097926 A1 | 4/2010 | Huang et al. | |
| 2010/0165876 A1 * | 7/2010 | Shukla et al. | 370/254 |
| 2010/0165877 A1 * | 7/2010 | Shukla et al. | 370/254 |
| 2010/0169467 A1 * | 7/2010 | Shukla et al. | 709/220 |
| 2010/0182933 A1 | 7/2010 | Hu et al. | |
| 2010/0214949 A1 | 8/2010 | Smith et al. | |
| 2010/0265832 A1 | 10/2010 | Bajpay et al. | |
| 2010/0306408 A1 | 12/2010 | Greenberg et al. | |
| 2011/0069706 A1 | 3/2011 | Sen et al. | |
| 2011/0161468 A1 | 6/2011 | Tuckey et al. | |
| 2012/0033665 A1 | 2/2012 | Jacob Da Silva et al. | |
| 2012/0069842 A1 | 3/2012 | Reddy et al. | |
| 2012/0093154 A1 | 4/2012 | Rosenberg et al. | |
| 2012/0128004 A1 | 5/2012 | Aybay et al. | |
| 2012/0155320 A1 | 6/2012 | Vohra et al. | |
| 2012/0155453 A1 | 6/2012 | Vohra et al. | |
| 2012/0158930 A1 | 6/2012 | Kalusivalingam et al. | |
| 2012/0158942 A1 | 6/2012 | Kalusivalingam et al. | |
| 2012/0189009 A1 | 7/2012 | Shekhar et al. | |

FOREIGN PATENT DOCUMENTS

| | | | |
|---|---|---|---|
| EP | 1 892 905 A1 | 2/2008 | |
| EP | 1 924 030 A1 | 5/2008 | |
| EP | 2 164 209 A1 | 3/2010 | |
| EP | 2 413 550 A1 | 7/2011 | |
| EP | 2 369 782 A1 | 9/2011 | |
| EP | 2 456 138 A1 | 5/2012 | |
| EP | 2 466 825 A1 | 6/2012 | |
| EP | 2 466 826 A1 | 6/2012 | |
| GB | 2 362 289 A | 11/2001 | |
| WO | WO 00/08801 | 2/2000 | |
| WO | WO 2008/144927 A1 | 12/2008 | |

OTHER PUBLICATIONS

Office Action for U.S. Appl. No. 12/345,498, mailed Apr. 28, 2010.
Final Office Action for U.S. Appl. No. 12/345,498, mailed Oct. 26, 2010.
U.S. Appl. No. 12/415,504, filed Mar. 31, 2009, entitled "Methods and Apparatus for Dynamic Automated Configuration Within a Control Plane of a Switch Fabric".
Office Action for U.S. Appl. No. 12/415,504, mailed Apr. 30, 2012.
Final Office Action for U.S. Appl. No. 12/415,504, mailed Oct. 10, 2012.
Office Action for U.S. Appl. No. 13/053,801, mailed Dec. 6, 2012.
Office Action for U.S. Appl. No. 12/969,233, mailed Nov. 20, 2012.
U.S. Appl. No. 12/968,846, filed Dec. 15, 2010, entitled "Host Side Protocols for Use With Distributed Control Plane of a Switch".
Office Action for U.S. Appl. No. 12/968,846, mailed Oct. 31. 2012.
U.S. Appl. No. 12/977,585, filed Dec. 23, 2010, entitled "Network Management Configuration for Retrieving and Aggregating Status Information From Resources Distributed Across a Network".
Office Action for U.S. Appl. No. 12/977,585, mailed Sep. 13, 2012.
U.S. Appl. No. 12/968,769, filed Dec. 15, 2010 entitled "Systems and Methods for Automatically Detecting Network Elements".
Office Action mailed Oct. 22, 2012 for U.S. Appl. No. 12/968,769, filed Dec. 15, 2010.
U.S. Appl. No. 12/976,075, filed Dec. 22, 2010 entitled Deriving Control Plane Connectivity During Provisioning of a Distributed Control Plane of a Switch.
Office Action mailed Nov. 7, 2012 for U.S. Appl. No. 12/968,886, filed Dec. 10, 2010.
Office Action mailed Jul. 30, 2012 for U.S. Appl. No. 12/968,957, filed Dec. 10, 2010.

(56) References Cited

OTHER PUBLICATIONS

Office Action mailed Sep. 17, 2012 for U.S. Appl. No. 12/951,706, mailed Sep. 17, 2012.
U.S. Appl. No. 13/435,919, filed Mar. 30, 2012, entitled "Methods and Apparatus for Virtualizing Switch Control Plane Engine".
Office Action mailed Mar. 14, 2013 for U.S. Appl. No. 13/197,212, filed Aug. 3, 2011.
U.S. Appl. No. 13/197,212, filed Aug. 3, 2011, entitled "Methods and Apparatus for Route Installation Acknowledgement and Acknowledgement Aggregation in BGP".
F.K. Liotopoulos et al., "A Modular, 160 Gbps ATM Switch Architecture for Multimedia Networking Support, based on a 3-Stage Clos Network" Proceedings of the International Teletraffic Congress. ITC-16. Teletraffic Engineering in a Competitive World. Edinburgh, UK, Jun. 7, 1999, Amsterdam: Elsevier, NL, vol. 3A, XP000877657 ISBN: 978-0-444-50268-1, pp. 529-538.
K. Kompella et al., "Virtual Private LAN Service (VPLS) Using BGP for Auto-Discovery and Signaling" [online], Retrieved from the Internet: <URL: http://www.ietf.org/rfc/rfc4761.txt>, Jan. 2007, 27 pages.
Cisco Systems, Inc., "Intermediate System-to-Intermediate System (IS-IS) TLVs" Document ID: 5739 [online], Retrieved from the Internet: <URL: http://www.cisco.com/en/US/tech/tk365/technologies_tech_note09186a0080094bbd.shtml>, Aug. 10, 2005, 8 pages.
Extended Search Report for European Application No. 11158837.2, mailed Jun. 21, 2011.
Extended Search Report for European Application No. 11179603.3, mailed Dec. 21, 2011.
Extended Search Report for European Application No. 11192571.5, mailed Mar. 19, 2012.
Extended Search Report for European Application No. 11192565.7, mailed Mar. 30, 2012.
Extended Search Report for European Application No. 11174003.1, mailed Feb. 8, 2012.
Extended Search Report for European Application No. 11175433.9, mailed Oct. 7, 2011.
U.S. Appl. No. 13/334,277, filed Dec. 22, 2011, entitled "Methods and Apparatus for Using Border Gateway Protocol (BGP) for Converged Fibre Channel (FC) Control Plane".
U.S. Appl. No. 13/333,031, filed Dec. 21, 2011, entitled "Methods and Apparatus for a Distributed Fibre Channel Control Plane".
U.S. Appl. No. 13/333,039, filed Dec. 21, 2011, entitled "Methods and Apparatus for a Distributed Fibre Channel Control Plane".

\* cited by examiner

HIERARCHICAL RESOURCE GROUPS FOR PROVIDING SEGREGATED MANAGEMENT ACCESS TO A DISTRIBUTED SWITCH

BACKGROUND

Some embodiments described herein relate generally to organization of network resources, and more particularly to hierarchical configuration files providing network configuration information with inheritance.

Known network fabric systems often include one or more peripheral processing devices, access switches, multi-stage switch fabrics, or other hardware and/or software resources. Many such network fabric systems often also include a number of configuration settings associated with the physical and/or logical entities included in the network fabric systems. For example, a network fabric system may include one or more configuration files associated with one or more access switches, route reflectors, virtual machines, virtual local area networks (VLANs), or other resources included in the network fabric system. In network fabric systems containing a large number of network resources, the amount of physical memory necessary to store these configuration files can result in cost and scaling constraints that impose limitations on network growth and performance. Thus, a need exists for methods and apparatus to minimize the amount of physical memory used to store configuration information associated with one or more resources included in a network fabric system.

SUMMARY

In one embodiment, an apparatus includes a network management module configured to execute at a network device operatively coupled to a switch fabric. The network management module is configured to receive a first set of configuration information associated with a subset of network resources from a set of network resources, the set of network resources being included in a virtual local area network from a plurality of virtual local area networks, the plurality of virtual local area networks being defined within the switch fabric. The first set of configuration information dynamically includes at least a second set of configuration information associated with the set of network resources.

DETAILED DESCRIPTION

Figure 1:
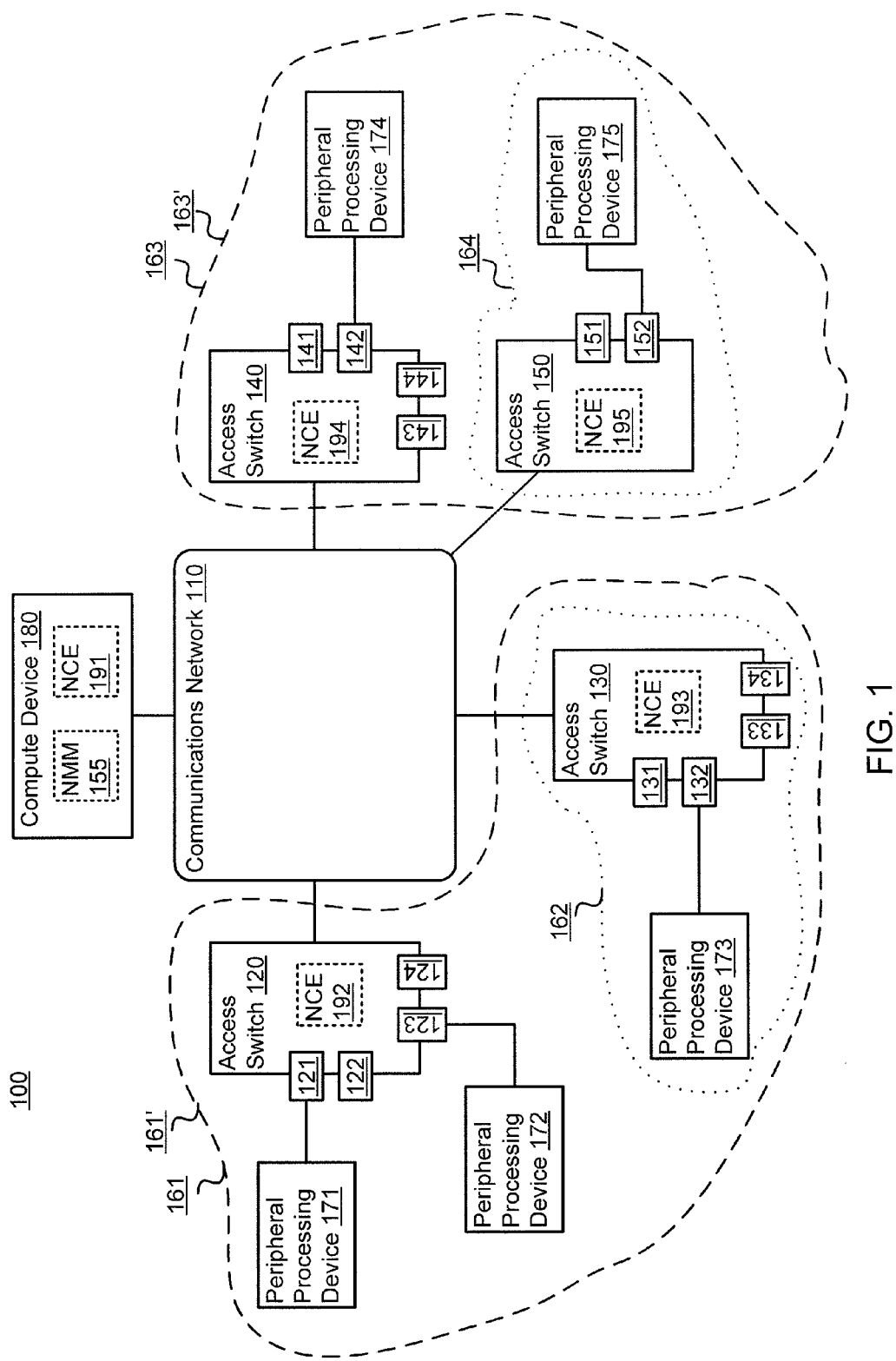
FIG. 1 is a schematic illustration of a switch fabric system that includes multiple resource groups, according to an embodiment.

In some embodiments, a switch fabric system can include multiple Virtual Data Center Fabrics (VDCFs), VLANs and/or resource groups. A VDCF can include a portion of the switch fabric system that operates as a single, autonomous data center fabric. A resource group can include, for example, one or more network resources included in the switch fabric system. Each resource group can optionally be of the same scope and/or include substantially the same network resources as one or more VLANs in the network. The one or more network resources can be, for example, one or more peripheral processing devices, access switches, physical ports, compute nodes, network control entities (NCEs), etc. In some embodiments, each resource group can be associated with a particular lessor (e.g., end user or customer) of a portion of the switch fabric system.

In some embodiments, each of one or more network resources of the switch fabric system can be associated with a configuration file. Each such configuration file can include, for example, identifier/name, logical and/or physical address, port assignment, peripheral processing device information, network portion assignment and/or other configuration information associated with the network resource with which that configuration file is associated. In some embodiments, each configuration file can include network topology information and/or hierarchy information defined consistent with the actual topology and/or hierarchy of physical and/or virtual resources in the switch fabric system.

In some embodiments, each configuration file for a given network grouping or resource defined at a given hierarchical level of the switch fabric system can include configuration information and/or a configuration file associated with one or more network resources included at a lower hierarchical level of the switch fabric system. For example, a configuration file associated with a resource group can include configuration information associated with that resource group and configuration information associated with each network resource included in that resource group. In another example, a configuration file associated with a VLAN or VDCF can include configuration information associated with that VLAN or VDCF, configuration information associated with one or more resource groups included in that VLAN or VDCF and configuration information associated with each network resource included in the one or more resource groups.

In some embodiments, a network management module included in a compute node of the switch fabric system can receive one or more signals including updated configuration information associated with one or more network resources. The network management module can optionally store the updated configuration information at, for example, a configuration database operatively coupled to the compute node. In some embodiments, the network management module can send one or more signals including the updated configuration information to each of the network resources associated with the updated configuration information. For example, the network management module can send one or more signals including the applicable updated configuration information to one or more NCEs instantiated at access switches in the switch fabric system. Each of the NCEs can then optionally update one or more configuration files for any network resources affected by the updated configuration information and associated with that NCE. As discussed above, each configuration file associated with a VLAN or resource group can include at least a portion of the configuration information associated with each network resource that is a member of that VLAN or resource group. In this manner, a separate configuration file for each network resource need not be generated and/or stored at the switch fabric system, thereby reducing the total amount of physical memory used to store configuration information at the switch fabric system.

FIG. 1 is a schematic illustration of a switch fabric system that includes multiple virtual local area networks (VLANs) and resource groups, according to an embodiment. More specifically, FIG. 1 illustrates a Switch Fabric System 100 that includes a Communications Network 110 physically and/or operatively coupled to a Compute Device 180 and Access Switches 120, 130, 140 and 150. The Access Switch 120 is physically and/or operatively coupled to Peripheral Processing Devices 171 and 172, the Access Switch 130 is physically and/or operatively coupled to a Peripheral Processing Device 173, the Access Switch 140 is physically and/or operatively coupled to a Peripheral Processing Device 174 and the Access Switch 150 is physically and/or operatively coupled to the Peripheral Processing Device 175. The Compute Device 180 includes a Network Management Module ("NMM") 155 and a Network Control Entity ("NCE") 191. The Access Switches 120, 130, 140 and 150 include NCEs 192-195, and Physical Ports 121-124, 131-134, 141-144 and 151-152, respectively. The Physical Port 121 is coupled to the Peripheral Processing Device 171, the Physical Port 123 is coupled to the Peripheral Processing Device 172, the Physical Port 132 is coupled to the Peripheral Processing Device 173 the Physical Port 142 is coupled to the Peripheral Processing Device 174 and the Physical Port 152 is coupled to the Peripheral Processing Device 175. The NCE 192 is associated with the Physical Ports 121-124, the NCE 193 is associated with the Physical Ports 131-134, the NCE 194 is associated with the Physical Ports 141-144 and the NCE 195 is associated with the Physical Ports 151-152.

The Communications Network 110 can be any combination of hardware and/or software (executing on hardware) configured to transmit data between any of the Peripheral Processing Devices 171-175 and/or any of the Access Switches 120, 130, 140 and 150. In some embodiments, the Communications Network 110 can be a switch fabric, such as a multi-stage switch fabric. The Communications Network 110 can optionally transmit data based at least in part on the Ethernet, Fibre Channel, FCoE, and/or another network protocol (such as cell-based network transmission). Additional details related to communications networks such as switch fabrics and multi-stage switch fabrics using cell-based network transmission are disclosed in U.S. patent application Ser. No. 12/495,337 entitled "Methods and Apparatus Related to Any-to-Any Connectivity within a Data Center" filed Jun. 30, 2009, which is incorporated herein by reference in its entirety. In some embodiments, the Communications Network 110 can include one or more hardware devices configured to exchange data according to one or more of the above-enumerated network protocols. Additional details related to communications networks such as switch fabrics and multi-stage switch fabrics are disclosed in U.S. patent application Ser. No. 12/558,130 entitled "Methods and Apparatus Related to a Low Cost Data Center Architecture," filed Sep. 11, 2009, which is incorporated herein by reference in its entirety.

Each of the Access Switches 120, 130, 140 and 150 can be any combination of hardware and/or software (executing in hardware) situated at the edges of the Communications Network 110. As shown in FIG. 1, the Access Switch 120, 130, 140, 150 and 150 can function as gateways to one or more peripheral processing devices coupled thereto. As also shown in FIG. 1, each of the Access Switches 120, 130, 140 and 150 can host one or more NCEs (described below), such as the NCE 192 hosted at the Access Switch 120, the NCE 193 hosted at the Access Switch 130, the NCE 194 hosted at the Access Switch 140 and the NCE 195 hosted at the Access Switch 150.

In some embodiments, each of the Access Switches 120, 130, 140 and 150 can be physically located within a chassis of the Switch Fabric System 100. In some embodiments, for example, each Access Switch 120, 130, 140 and 150 can be located within the same chassis. In other embodiments, each Access Switch 120, 130, 140 and 150 can be located within a different chassis. Structurally, the Access Switches 120, 130, 140 and 150 can function as both source access switches and destination access switches. Accordingly, the Access Switches 120, 130, 140 and 150 can send data (e.g., a data stream of data frames, packets and/or data cells) to and receive data from a data plane portion of the Communications Network 110, and to and from the respective connected Peripheral Processing Devices 171-175. Each of the Access Switches 120, 130, 140 and 150 can optionally be referred to as an edge device and/or a top-of-the-rack "TOR" device.

As shown in FIG. 1, each of the Access Switches 120, 130, 140 and 150 is configured to communicate with the other Access Switches 120, 130, 140 and 150 via a data plane portion of the Communications Network 110. Specifically, the data plane portion of the Communications Network 110 is configured to provide any-to-any connectivity between the Access Switches 120, 130, 140 and 150 at relatively low latency. For example, the data plane portion of the Communications Network 110 can be configured to transmit (e.g., convey) data between Access Switches 120, 130, 140 and 150. In some embodiments, the Communications Network 110 can have at least hundreds or thousands of ports (e.g., egress ports and/or ingress ports) through which Access Switches 120, 130, 140 and 150 can transmit and/or receive data. Additional details related to communications networks such as switch fabrics and multi-stage switch fabrics using cell-based network transmission are disclosed in U.S. patent application Ser. No. 12/495,337 entitled "Methods and Apparatus Related to Any-to-Any Connectivity within a Data Center" filed Jun. 30, 2009, which is incorporated herein by reference in its entirety.

As discussed in further detail herein, the Access Switches 120, 130, 140 and 150 can be configured to host one or more network control entities (NCEs) to manage the Physical Ports 121-124, 131-134, 141-144 and 151-152 of the Access Switches 120, 130, 140 and 150, respectively. For example, the Access Switch 120 can host the NCE 192 to manage the Physical Ports 121-124 and 131-132 and the Access Switch 140 can host the NCE 194 to manage the Physical Ports 141-143 and 152. The Compute Device 180 can also optionally host one or more NCEs to manage one or more of the Physical Ports 121-124, 131-134, 141-144 and 151-152. For example, the Compute Device 180 can host the NCE 191 to manage the Physical Ports 133 and 151. The NCEs 191-195 can each be processes, applications, virtual machines and/or some other software module (executing in hardware) or a hardware module that is executed at the Compute Device 180, the Access Switch 120, the Access Switch 130, the Access Switch 140 and the Access Switch 150, respectively. In some embodiments, the NCEs 191-195 and/or the NMM 155 can be considered a part of a control plane of the Switch Fabric System 100.

In some embodiments, each of the NCEs 191-195 can be defined and/or spawned by a controlling entity or module, such as the NMM 155 hosted at the Compute Device 180. The Compute Device 180 can provision one or more new NCEs based on a current amount of host protocol-based traffic and/or other load-balancing or other network management factors. Each of the NCEs 191-195 can optionally be configured to receive and respond to one or more host protocol requests, such as one or more DHCP, ARP, RARP, IGMP or other host protocol requests. In some embodiments, each of the NCEs 191-195 can be associated with one or more tables or data records (not shown in FIG. 1) storing address information for one or more devices included in the Switch Fabric System 100, such as an IP and/or MAC address of one or more of the Access Switches 120, 130, 140 and 150 and/or one or more of the Peripheral Processing Devices 171-175.

Each of the Physical Ports 121-124, 131-134, 141-144 and 151-152 can be, for example, a physical communication port, such as an Ethernet/Fibre Channel over Ethernet ("FCoE") port, a Fibre Channel port, a coaxial cable port, or other physical communication port. In some embodiments, one or more of the physical ports enumerated above can be physically coupled to one or more peripheral processing devices to enable exchange of data therewith.

The Compute Device 180 is any combination of hardware and/or software (executing on hardware) configured to perform one or more network management tasks. In some embodiments, the Compute Device 180 can be a server device. The Compute Device 180 can be physically and/or operatively coupled to the Communications Network 110 via, for example, a wired and/or wireless Ethernet, Fibre Channel or other physical and/or logical connection. As shown in FIG. 1, the Compute Device 180 includes and/or hosts the NMM 155 and the NCE 191.

Each of the Peripheral Processing Devices 171-175 are any combination of hardware and/or software (executing on hardware) capable of transmitting and/or receiving information across the Communications Network 110 via an access switch. In some embodiments, one or more of the above-enumerated peripheral processing devices can be a server device, an application server, a database system, a storage device, gateway, workstation, a compute device and/or the like. Each of the Peripheral Processing Devices 171-175 can optionally be, for example, compute nodes, service nodes, routers, and storage nodes, as described in further detail herein. In some embodiments, one or more of the Peripheral Processing Devices 171-175 can perform one or more computing tasks, such as one or more data storage, Software as a Service (SAS), web service, content request, or other computing tasks.

The Peripheral Processing Devices 171-175 can be in communication with and/or operatively coupled to one or more Physical Ports 121-124, 131-134, 141-144, 151-152 of the Access Switches 120, 130, 140 and 150, respectively, using any suitable connection such as, for example, an optical connection (e.g., an optical cable and optical connectors), an electrical connection (e.g., an electrical cable and electrical connectors) and/or the like. Similarly stated, each of the Physical Ports 121-124, 131-134, 141-144, 151-152 can provide a communication interface through which a Peripheral Processing Device 171-175 can be operatively coupled to an Access Switch 120, 130, 140, 150, as described in further detail herein. As such, the Peripheral Processing Devices 171-175 are configured to send data (e.g., data frames, data packets, data cells, etc.) to and receive data from the Access Switches 120, 130, 140 and 150. In some embodiments, each connection between the Peripheral Processing Devices 171-175 and the respective access switches 120, 130, 140 and 150 is a direct link. In other embodiments, the Peripheral Processing Devices 171-175 can be operatively coupled to the Access Switches 120, 130, 140 and 150 via intermediate modules.

The NMM 155 is any combination of hardware and/or software (executing on hardware) configured to manage the provisioning, allocation and/or configuration of network resources in the Switch Fabric System 100. For example, the NMM 155 can manage the definition, initiation, instantiation and/or destruction of one more NCEs hosted at, for example, a compute device (such as the Compute Device 180) and/or an access switch (such as any of the Access Switches 120, 130, 140 and 150). In some embodiments, the NMM 155 can receive and respond to one or more DHCP requests originating at a peripheral processing device coupled to an access switch, such as any of the Peripheral Processing Devices 171-175 coupled to any of the Access Switches 120, 130, 140 and 150. In some embodiments, the NMM can receive, update, and transmit configuration information associated with one or more network resources included in the Switch Fabric System 100. For example, the NMM 155 can send and/or receive one or more signals including updated configuration information to and/or from the NCEs 191-195 for use thereby.

In some embodiments, the NMM 155 can also define one or more virtual local area networks (VLANs) within the Switch Fabric System 100. In such embodiments, a VLAN can comprise and/or be defined by any valid combination of network resources, such as one or more peripheral processing devices and one or more access switches, each of the one or more access switches within the VLAN being in communication with at least one of the one or more peripheral processing devices via one or more physical ports of that access switch. As shown in FIG. 1, the NMM 155 defines a VLAN 161' comprising the Access Switch 120, the Access Switch 130, the Peripheral Processing Devices 171-173, the Physical Ports 121-124 and 131-134 and the NCEs 192 and 193. As also shown in FIG. 1, the NMM defines a VLAN 163' comprising the Access Switch 140, the Access Switch 150, the Peripheral Processing Devices 174-175, the Physical Ports 141-144 and 151-152 and the NCEs 194 and 195. In some embodiments, the VLAN 161' and/or the VLAN 163' can optionally be a VDCF configured to operate as an autonomous data center fabric.

In some embodiments, the NMM 155 can also define one or more resource groups within the Switch Fabric System 100. In such embodiments, a resource group can be comprising and/or be defined by any valid combination of network resources, such as one or more peripheral processing devices, access switches, route reflectors, routing engines and/or physical ports (also known as interfaces). In some embodiments, network resources included in a particular VLAN can likewise be included in a particular resource group. In such embodiments, each network resource included in the network resource can be identified by a prepended identifier portion based on an identifier of the VLAN. In this manner, each network resource included in the resource group can be uniquely identified by the Switch Fabric System 100. In some embodiments, the VLAN identifier can be based on a globally unique layer-2 identifier associated with the VLAN. In some embodiments, each resource group can be associated with an entity or individual (e.g., end user or customer) that leases or is associated with a portion of the network resources included in the Switch Fabric System 100. In this case, the resource group associated with that entity or individual can comprised the network resources leased by or is associated with the entity or individual.

As shown in FIG. 1, the NMM 155 defines a Resource Group 161 that includes the same network resources included in the VLAN 161'. The NMM 155 also defines a Resource Group 162 that includes a subset of the network resources included in the VLAN 161', namely the Access Switch 130, the Peripheral Processing Device 173, the Physical Ports 131-134 and the NCE 193. As also shown in FIG. 1, the NMM 155 defines a Resource Group 163 that includes the same network resources included in the VLAN 163'. The NMM also defines a Resource Group 164 that includes a subset of the network resources included in the VLAN 163', namely the Access Switch 150, the Peripheral Processing Device 175, the Physical Ports 151 and 152 and the NCE 195.

Although not shown in FIG. 1, in some embodiments, one of the Peripheral Processing Devices 171-175 can send one or more data packets and/or frames to another of the Peripheral Processing Devices 171-175 via one of the Access Switches 120, 130, 140 and 150 and the Communications Network 110. For example, the Peripheral Processing Device 173 can send a data frame to the Peripheral Processing Device 175 via the Access Switch 130, the Communications Network 110 and the Access Switch 150. The Peripheral Processing Device 173 can format and/or send the data frame in accordance with one or more configuration settings associated with the Resource Group 161 and the Resource Group 162 (of which the Peripheral Processing Device 173 is a member). The Peripheral Processing Device 173 can optionally send a second data frame to the Peripheral Processing Device 175 via the Access Switch 130, the Communications Network 110 and the Access Switch 150. In some embodiments, the Peripheral Processing Device 173 can format and/or send the second data frame in accordance with one or more updated configuration settings associated with the Resource Group 161. In such embodiments, the updated configuration settings associated with the Resource Group 161 can be applied to and/or inherited by a set of configuration settings associated with the Resource Group 162, and thus by each network resource included in the Resource Group 162 (e.g., the Peripheral Processing Device 173).

Figure 2:
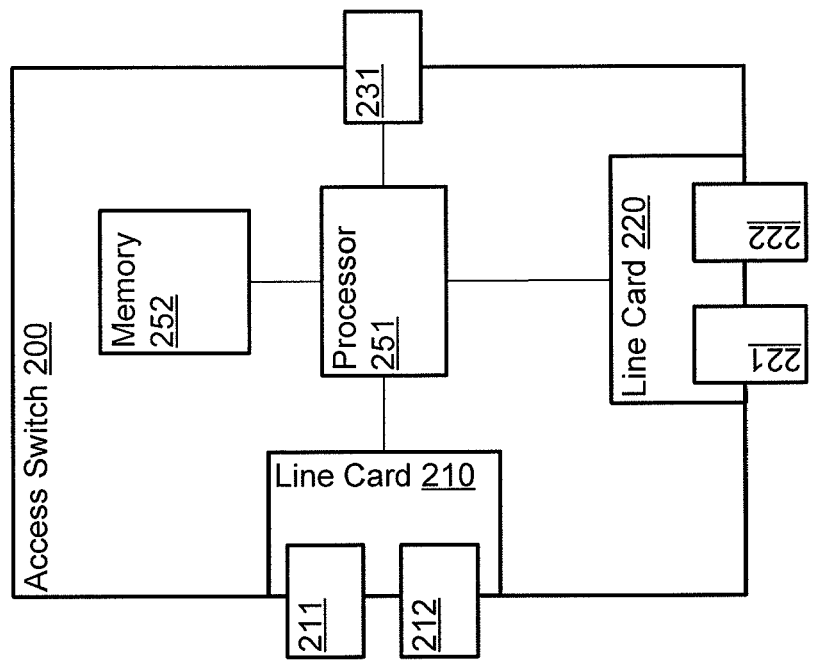
FIG. 2 is a schematic illustration of an access switch of a switch fabric system, according to another embodiment.

FIG. 2 is a schematic illustration of an access switch of a switch fabric system, according to another embodiment. More specifically, FIG. 2 is a system block diagram of an Access Switch 200, similar to the Access Switches 120, 130, 140 and 150 described in connection with FIG. 1 above. The Access Switch 200 includes a Processor 251, a Memory 252, a Line Card 210, a Line Card 220, and a Physical Port 231. The Processor 251 is operatively coupled to the Memory 252, the Line Card 210, the Line Card 220 and the Physical Port 231. The Line Card 210 includes the Physical Ports 211 and 212. The Line Card 220 includes the Physical Ports 221 and 222. In some embodiments, the Line Cards 210 and/or 220 include one or more processors and/or memories (not shown).

Similar to the Physical Ports 121-124, 131-134, 141-144 and 151-152 of the Access Switches 120, 130, 140, 150 (shown in FIG. 1), the Physical Ports 211, 212, 221 and 222 can be configured to communicate with peripheral processing devices. For example, the Physical Ports 211, 212, 221 and 222 can implement a physical layer using twisted-pair electrical signaling via electrical cables or fiber-optic signaling via fiber-optic cables. In some embodiments, some of the Physical Ports 211, 212, 221 and 222 can implement one physical layer such as twisted-pair electrical signaling, and others of the Physical Ports 211, 212, 221 and 222 can implement a different physical layer, such as fiber-optic signaling. Furthermore, the Physical Ports 211, 212, 221 and 222 can be configured to allow the Access Switch 200 to communicate with peripheral processing devices, such as, for example, computer servers (servers), via a common protocol such as Ethernet or Fibre Channel. In some embodiments, some of the Physical Ports 211, 212, 221 and 222 can implement one protocol such as Ethernet and others of the Physical Ports 211, 212, 221 and 222 can implement a different protocol such as Fibre Channel. Thus, the Access Switch 200 can be in communication with multiple peripheral processing devices using homogeneous or heterogeneous physical layers and/or protocols via the Physical Ports 211, 212, 221 and 222.

The Physical Port 231 can be configured to be in communication with other access switches via a communications network such as a switch fabric (e.g., the Communications Network 110). The Physical Port 231 can be part of one or more network interface devices (e.g., a 40 Gigabit (Gb) Ethernet interface, a 100 Gb Ethernet interface, etc.) through which the Access Switch 200 can send signals to and/or receive signals from a communications network. The signals can be sent to and/or received from the communications network via an electrical link, an optical link and/or a wireless link operatively coupled to the Access Switch 200. In some embodiments, the Access Switch 200 can be configured to send signals to and/or receive signals from the communications network based on one or more protocols (e.g., an Ethernet protocol, a multi-protocol label switching (MPLS) protocol, a Fibre Channel protocol, a Fibre-Channel-over Ethernet protocol, an Infiniband-related protocol).

In some embodiments, the Physical Port 231 can implement a different physical layer and/or protocol than those implemented at the Physical Ports 211, 212, 221 and 222. For example, the Physical Port 211, 212, 221 and 222 can be configured to communicate with peripheral processing devices using a data link layer protocol based on data packets and the Physical Port 231 can be configured to communicate via a switch fabric using a data link layer protocol based on data cells. Said differently, the Access Switch 200 can be an edge device of a network switch such as a distributed network switch.

In some embodiments, the Access Switch 200 can be configured to prepare a data packet (e.g., an Ethernet frame and/or packet) to enter a data plane portion of a communications network (e.g., the Communications Network 110). For example, the Access Switch 200 can be configured to forward, classify, and/or modify the packet encapsulation (e.g., modify, add and/or remove a header portion, footer portion and/or any other identifier included within the data packet) of a data packet prior to sending the data packet to the communications network. Additionally, the Access Switch 200 can be configured to partition and/or divide the data packet into data cells (e.g., having fixed length payloads) prior to sending the data cells to the switch fabric. Additional details related to packet classification are described in U.S. patent application Ser. No. 12/242,168 entitled "Methods and Apparatus Related to Packet Classification Associated with a Multi-Stage Switch," filed Sep. 30, 2008, and U.S. patent application Ser. No. 12/242,172, entitled "Methods and Apparatus for Packet Classification Based on Policy Vectors," filed Sep. 30, 2008, both of which are incorporated herein by reference in their entireties.

Figure 3:
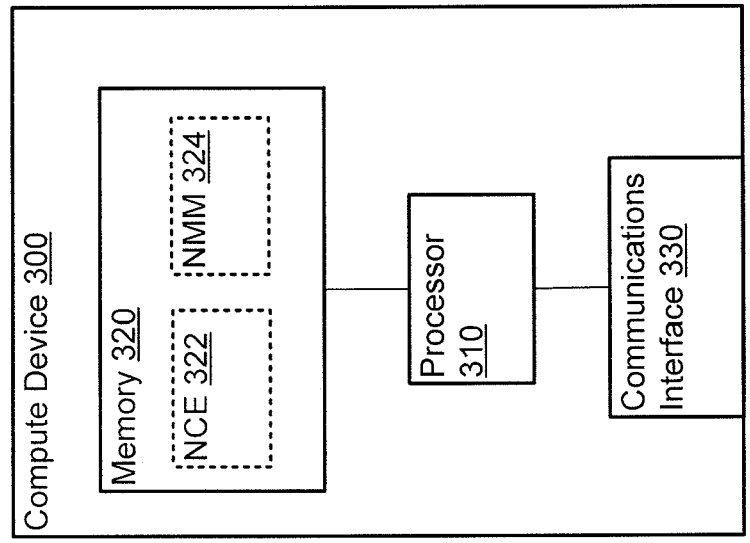
FIG. 3 is a schematic illustration of a compute device of a switch fabric system, according to another embodiment.

FIG. 3 is a schematic illustration of a compute device of a switch fabric system, according to another embodiment. More specifically, FIG. 3 is a system block diagram of a Compute Device 300 substantially similar to the Compute Device 160 described in connection with FIG. 1 above, according to an embodiment. The Compute Device 300 includes a Processor 310, a Memory 320, and a Communications Interface 330. The Processor 310 is operatively coupled to the Memory 320 and the Communications Interface 330.

The Compute Device 300 can communicate with other compute devices, peripheral processing devices and/or access switches via the Communications Interface 330.

As illustrated in FIG. 3, the Compute Device 300 can host a Network Control Entity ("NCE") 322 and a Network Management Module 324 similar to the Network Control Entity 191 and the Network Management Module ("NMM") 155, respectively of FIG. 1. In other words, the NCE 322 and the NCE 324 can each be one of a process, application, virtual machine, and/or some other software module (executing in hardware) or a hardware module that is executed at the Compute Device 300. In some embodiments, for example, instructions that implement the NCE 322 and/or the NMM 324 can be stored at the Memory 320 and executed at the Processor 310.

In some embodiments, the Compute Device 300 can be dedicated to hosting the NCE 322 and/or the NMM 324. In other words, the Compute Device 300 can allocate all or substantially all of its computing resources (e.g., processing capacity and memory) to the NCE 322 and/or the NMM 324. In some embodiments, the Compute Device 300 can host other processes, applications, virtual machines, and/or software modules (executing in hardware) in addition to the NCE 322 and/or the NMM 324. For example, the Compute Device 300 can be a general purpose compute device or compute node that is configured to host multiple processes, applications, virtual machines, and/or software modules.

Figure 4:
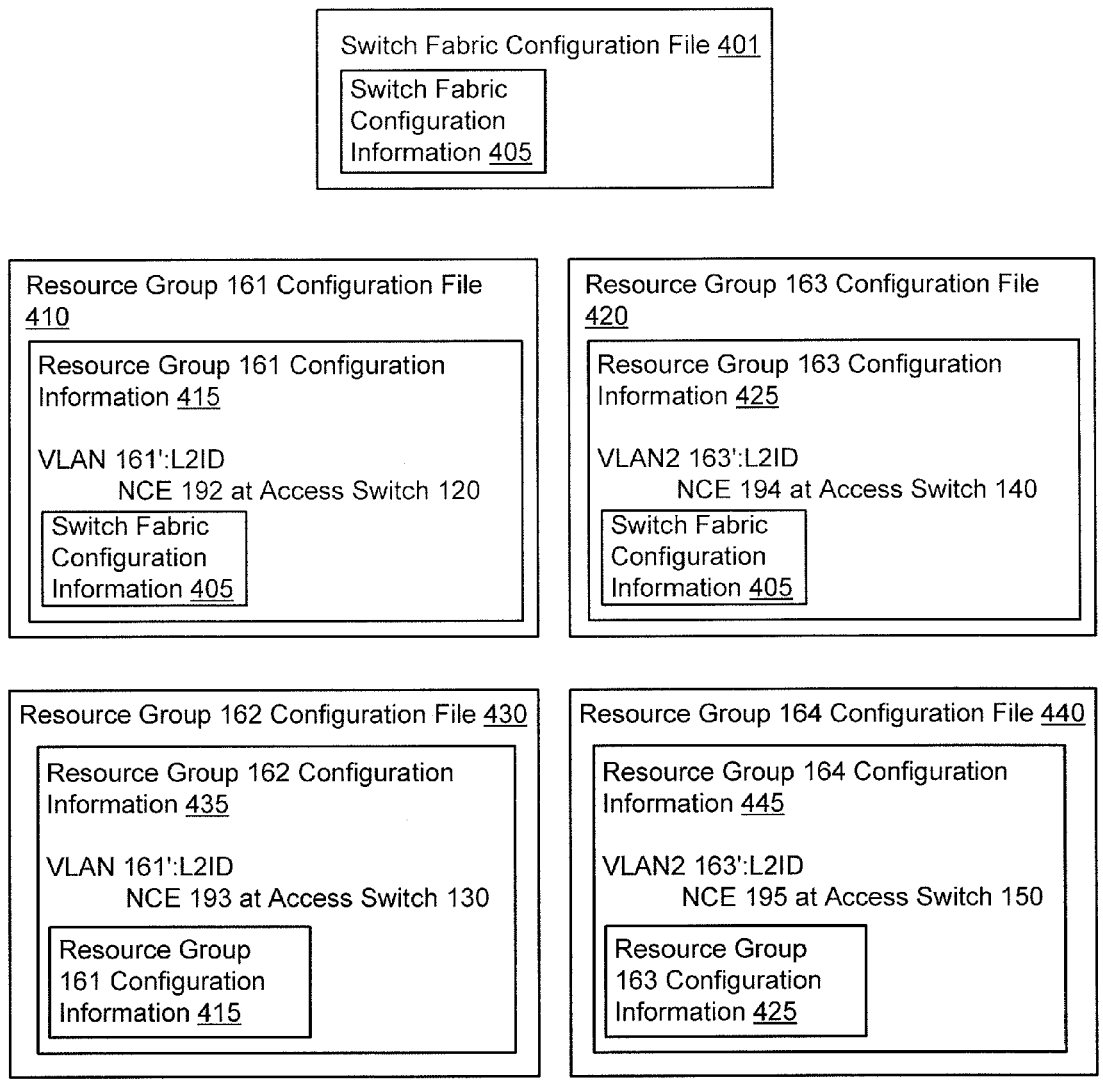
FIG. 4 is a diagram of a set of configuration files for a switch fabric system and multiple resource groups of the switch fabric system, according to another embodiment.

FIG. 4 is a diagram of a set of configuration files for a switch fabric system and multiple resource groups and VLANs of the switch fabric system, according to another embodiment. More specifically, FIG. 4 illustrates a Set of Configuration files 400 that includes a Switch Fabric Configuration File 401 and Resource Group Configuration Files 410, 420, 430 and 440. The Switch Fabric Configuration File 401 includes Switch Fabric Configuration Information 405. Resource Group 161 Configuration File 410 includes Resource Group 161 Configuration Information 415, which includes configuration information associated with the Resource Group 161 and the Switch Fabric Configuration Information 405. Resource Group 163 Configuration File 420 includes Resource Group 163 Configuration Information 425, which includes configuration information associated with the Resource Group 163 and the Switch Fabric Configuration Information 405. Resource Group 162 Configuration File 430 includes Resource Group 162 Configuration Information 435, which includes configuration information associated with the Resource Group 162 and the Resource Group 161 Configuration Information 415. Resource Group 163 Configuration File 440 includes Resource Group 164 Configuration Information 445, which includes configuration information associated with the Resource Group 164 and the Resource Group 163 Configuration Information 425.

In some embodiments, the Switch Fabric Configuration Information 405 included in the Switch Fabric Configuration File 401 can include configuration information associated with a switch fabric system, such as the Switch Fabric System 100 discussed in connection with FIG. 1 above. The Switch Fabric Configuration Information 405 can include, for example, a list, hierarchy and/or topology of one or more VLANs and/or resource groups defined within a switch fabric system. The list, hierarchy and/or topology can optionally include identifier information, logical and/or physical address information, physical location information and/or other information associated with the one or more VLANs and/or resource groups. In some embodiments, the Switch Fabric Configuration Information 405 can include information associated with a total number of network resources included in a switch fabric system. This information can include, for example, a total number of each type of network resource included in the switch fabric system. The Switch Fabric Configuration Information 405 can further include network portion assignment information, port assignment information and peripheral processing device information. The network portion assignment information can include, for example, information sufficient to define the one or more resource groups or VLANs. The port assignment information can include, for example, association of one or more physical ports of the switch fabric system with one or more NCEs. The peripheral processing device information can include, for example, identifier, logical and/or physical address, storage capacity, and/or other information associated with one or more peripheral processing devices included in and/or operatively coupled to the switch fabric system.

The Resource Group 161 Configuration Information 415 can include information associated with a set of network resources included in the Resource Group 161 (similar to the Resource Group 161 discussed in connection with FIG. 1 above). This information can include, for example, information associated with one or more VLANs of which one or more network resources included in the Resource Group 161 is a part, such as the VLAN 161'. The VLAN information can include a VLAN identifier and/or other VLAN configuration information.

The Resource Group 161 Configuration Information 415 can further include configuration information associated with the one or more network resources included in both the Resource Group 161 and the VLAN 161'. For example, one or more network resources can include the NCE 192 instantiated at the Access Switch 120. As shown in FIG. 4, configuration information associated with the NCE 192 can include an identifier of the NCE 192 and/or a list of physical ports associated with the NCE 192. The identifier of the NCE 192 can be based at least in part on an identifier of the Resource Group 161 and an identifier of the VLAN 161', such as a name of the Resource Group 161 and a layer-2 identifier of the VLAN 161'. For example, the identifier of the NCE 192 can include a prepended identifier portion corresponding to an identifier of the Resource Group 161 and an identifier of the VLAN 161', followed by a logical and/or physical address of the NCE 192. In this manner, the identifier of the NCE 192 can be globally unique across the switch fabric system. In some embodiments, each network resource included in the Resource Group 161 can have an identifier including the prepended identifier portion corresponding to the name of the Resource Group 161 and the identifier of the VLAN 161'. In this manner, each network resource included in the Resource Group 161' can have a globally unique identifier and thereby be distinguishable across the switch fabric system.

The Resource Group 161 Configuration Information 415 can also include the Switch Fabric Configuration Information 405. The Switch Fabric Configuration Information 405 can include the information described above. In some embodiments, the Switch Fabric Configuration Information 405 can be included in the Resource Group 161 Configuration Information 415 via one or more dynamic links or "include" statements. In such embodiments, instead of including a copy of the Switch Fabric Configuration Information 405 as it exists at the time of the definition of the Resource Group 161 Configuration Information 415, the dynamic link or "include" statement can dynamically insert a current version of the Switch Fabric Configuration Information 405 into the Resource Group 161 Information 415 whenever the Resource Group 161 Configuration File 410 is accessed and/or evaluated. In this manner, any change(s) made to the Switch Fabric Configuration Information 405 can be programmatically propagated through to the Resource Group 161 Configuration File 410. As such, any network resources (e.g., access switches, physical ports, NCEs, etc.) associated with the Resource Group 161 Configuration File 415 can access configuration settings associated with the switch fabric without manual re-entry and/or copying of the Switch Fabric Configuration Information 405 into the Resource Group 161 Configuration File 410.

The Resource Group 162 Configuration Information 435 can include configuration information associated with a set of network resources included in the Resource Group 162 (discussed in connection with FIG. 1 above). This information can include, for example, information associated with the VLAN 161', inasmuch as one or more network resources included in the Resource Group 162 is included in the VLAN 161'. The VLAN information can be similar to the VLAN information described in connection with the Resource Group 161 Configuration Information 415 above. This information can also include, for example, a list, hierarchy, topology and/or mapping of network resources included in the Resource Group 162. In this manner, any network resource referencing the Resource Group 162 Configuration File 430 can reference information associated with the network resources included in the Resource Group 162.

As shown in FIG. 1, the Resource Group 162 can be a subset of network resources included in the Resource Group 161. As such, as shown in FIG. 4, the Resource Group 162 Configuration Information 435 can dynamically reference and/or include the Resource Group 161 Configuration Information 415. In this manner, each network resource from the Resource Group 162 can reference configuration information associated with its "parent" group, i.e., the Resource Group 161. Such configuration information can optionally apply to each such network resource included in the Resource Group 162, inasmuch as each such network resource can inherit one or more configuration settings and/or properties associated with the Resource Group 161. In some embodiments, as specified by the Resource Group 162 Configuration Information 435, each network resource from the Resource Group 162 can have a network identifier including a prepended identifier portion specifying an identifier of the Resource Group 161, an identifier of the Resource Group 162 and an identifier of the VLAN 161' (in which that network resource is included). In this manner, each network resource included in the Resource Group 162 can be globally identifiable across the switch fabric system. Alternatively, one or more resources included in the Resource Group 162 can have an identifier defined based on some other combination of a layer-2 ID, an identifier of the VLAN 161', an identifier of the Resource Group 161 and/or an identifier of the Resource Group 162.

Although not discussed in further detail herein, as shown in FIG. 4, the Resource Group 163 Configuration Information 425 can include similar information associated with the one or more network resources included in the Resource Group 163 within the switch fabric system, along with a dynamic link, reference or include statement that includes the Switch Fabric Configuration Information 405. The Resource Group 164 Configuration Information 445 can include similar information associated with the one or more network resources included in the Resource Group 164 within the switch fabric system, along with a dynamic link, reference or include statement that includes the Resource Group 163 Configuration Information 425.

As is clear from the various levels of information encapsulation present within the Switch Fabric Configuration File 401, the Resource Group 161 Configuration File 410 and the Resource Group 162 Configuration File 430, the Set of Configuration Files 400 includes a hierarchical arrangement of configuration information associated with a switch fabric system. Thus, reference to a configuration file for a particular hierarchical level within the switch fabric system (such as at the switch fabric or resource group level) includes reference to configuration information associated with each network resource included both at that level within the particular switch fabric or resource group, and one or more levels "above". This inheritance thus allows for more efficient updating of configuration information and files, as changes to a particular configuration file for a given VLAN, resource group and/or network resource can be dynamically and/or programmatically propagated (e.g., without the repeated manual input of a network administrator) through to configuration files for another VLAN, resource group and/or network resource included at one or more levels "below" in the switch fabric hierarchy.

Figure 5:
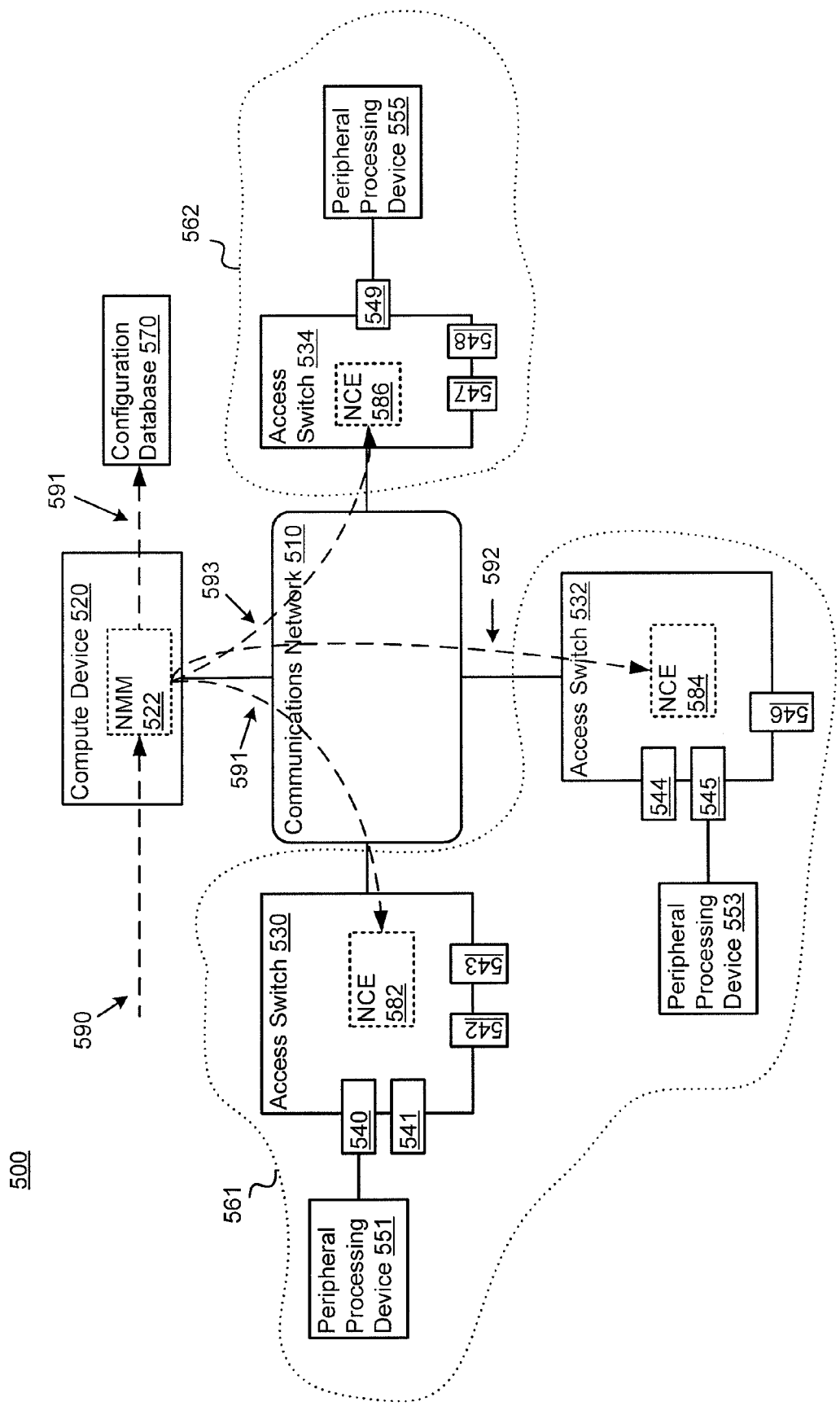
FIG. 5 is a schematic illustration of a switch fabric system that receives and distributes updated configuration information throughout the switch fabric system, according to another embodiment

FIG. 5 is a schematic illustration of a switch fabric system that receives and distributes updated configuration information throughout the switch fabric, according to another embodiment. More specifically, FIG. 5 illustrates a Communications Network 510 physically and/or operatively coupled to a Compute Device 520 and Access Switches 530, 532 and 534. The Access Switch 530 is physically and/or operatively coupled to Peripheral Processing Device 551, the Access Switch 532 is physically and/or operatively coupled to a Peripheral Processing Device 553, and the Access Switch 534 is physically and/or operatively coupled to a Peripheral Processing Device 555. The Compute Device 520 includes a Network Management Module ("NMM") 522 and is coupled to a Configuration Database 570. The Access Switches 530, 532 and 534 include NCEs 582, 584 and 586, and Physical Ports 540-543, 544-546 and 547-549, respectively. The Physical Port 540 is coupled to the Peripheral Processing Device 551, the Physical Port 545 is coupled to the Peripheral Processing Device 553 and the Physical Port 549 is coupled to the Peripheral Processing Device 555. The NCE 582 is associated with the Physical Ports 540-543, the NCE 584 is associated with the Physical Ports 544-546 and the NCE 586 is associated with the Physical Ports 547-549.

The Communications Network 510, the Access Switches 530, 532, 534, the NCEs 582, 584, 586, the Physical Ports 540-543, 544-546, 547-549, the Compute Device 520, the Peripheral Processing Devices 530, 532, 534 and the NMM 522 can each be substantially similar to their like-named counterparts discussed in connection with FIG. 1 above.

The Configuration Database 570 can be any combination of hardware and/or software (executing in hardware) configured to receive and store configuration information associated with the Switch Fabric System 500. As shown in FIG. 5, the Configuration Database 570 can be operatively and/or physically coupled to the NMM 522 instantiated at the Compute Device 520. In some embodiments, the Configuration Database 570 can be any relational database, such as an Oracle, Sybase, MySQL, PostgreSQL, SQL Server, or other relational database. In some embodiments, the Configuration Database 570 can include a physical memory, such as one or more hard disk and/or flash memory-based storage memories.

The NMM 522 defines a Resource Group 561 that includes the Access Switch 530 and 532, the Peripheral Processing Devices 551 and 553, the NCEs 582 and 584 and the Physical Ports 540-543 and 544-546. The NMM 522 also defines a Resource Group 562 that includes the Access Switch 534, the Peripheral Processing Device 555, the NCE 586 and the Physical Ports 547-549.

As shown in FIG. 5, the NMM 522 instantiated at the Compute Device 520 receives a Signal 590. The Signal 590 can include configuration information associated with a network resource and/or device included in a specified resource group of the Switch Fabric System 500 (such as a network resource and/or device included in the Resource Group 561 or the Resource Group 562). The Signal 590 can be based at least in part on user input. For example, a user or administrator of the Resource Group 561 (or a portion thereof) can enter one or more configuration changes associated with one or more elements of the Resource Group 561 via, for example, a configuration interface, system or application (not shown in FIG. 5). In this example, the configuration interface, system, or application can present the user or administrator with configuration information and/or edit options associated with the Resource Group 561 only. In this manner, the configuration interface can present the configuration information and/or edit options such that the user or administrator perceives that he/she is providing updated configuration information associated with a single hardware-based system—when in fact the configuration information is associated with one or more physical and/or logical entities (e.g., thousands of logical entities) distributed and/or instantiated across one or more physical devices (e.g., hundreds or thousands of physical entities) included in the Switch Fabric System 500. In some embodiments, the configuration information included in the Signal 590 can be based at least in part on a predefined, predetermined and/or scheduled configuration change. In such embodiments, the configuration information and/or changes included in the Signal 590 can be generated by, for example, another compute device or other network resource or device not shown in FIG. 5.

The NMM 522 can next make one or more configuration changes to one or more network resources included in the Switch Fabric System 500 based on the contents of the Signal 590. For example, the NMM 522 can change the configuration of one or more VLANs and/or resource groups defined within the Switch Fabric System 500 by adding or removing one or more network resources from within a given VLAN or resource group. In some embodiments, the NMM 522 can, based on the contents of the Signal 590, rename one or more network resources, define a new NCE instance, associate one or more of the Physical Ports 540-549 with a particular NCE from the NCEs 582, 584, 586, etc.

The NMM 522 can optionally update a master configuration file or root configuration file (not shown in FIG. 5) associated with the Switch Fabric System 500. For example, as shown in FIG. 4 above, the NMM 522 can update a configuration file associated with the entire Switch Fabric System 500 (e.g., the Switch Fabric Configuration File 401). In some embodiments, this master configuration file can include configuration information associated with both the Switch Fabric System 500 as a whole (e.g., the Switch Fabric Configuration Information 405 of FIG. 4) and configuration information associated with one or more resource groups defined by the NMM or other entity of the Switch Fabric System 500 (e.g., the Resource Group 161 Configuration Information 415 of FIG. 4). In this manner, the NMM 522 can maintain a hierarchical configuration file associated with each network resource included in the Switch Fabric System 500. In some embodiments, the master configuration file can include one or more references that each include and/or link to one or more other configuration files associated with a resource group, VLAN and/or other network resource included in the Switch Fabric System 500. In such embodiments, as each such other configuration file changes, each change will be automatically reflected in the master configuration file, inasmuch as the master configuration file dynamically includes the contents of each referenced configuration file when the master configuration file is evaluated, output and/or accessed by another network resource, a user, etc. Said differently, the NMM 522 can, in response to the Signal 590, update relevant configuration information for a given device or network element by updating a single configuration file associated with that device or network element. Then, based on the configuration file inheritance described above, the updated configuration information can be inherited by and/or propagated through to one or more other configuration files associated with other network devices and/or elements included in the Switch Fabric System 500. In this manner, the NMM 522 can make a resource-group-wide and/or system-wide update to the configuration information for a given device or network element by making an update to a single configuration file associated with that device or network element. Consequently, configuration information for the remaining unaffected devices or network elements need not be updated, and updated configuration information is sent or deployed only to the affected devices or network resources.

Prior to sending the updated configuration information, the NMM 522 can determine whether any conflicts exist (1) within the updated configuration information for a given network device or element and/or (2) between the configuration information for two or more network devices, elements and/or resource groups. For example, the NMM 522 can determine whether the updated configuration information for a given access switch (such as the Access Switch 532) involves allocation and/or use of a greater number of physical ports than currently exist on the given access switch. Alternatively, the NMM 522 can determine whether the updated configuration information for the given access switch involves allocation and/or use of a first number of physical ports that, when combined with a second number of physical ports of the access switch already allocated to another resource group, exceeds the number of physical ports existing and/or instantiated at the given access switch.

In either or both of the above examples, the NMM 522 can optionally ignore the one or more conflicts and proceed to send the updated configuration information as discussed below. Alternatively, the NMM 522 can resolve the conflicting configuration information and/or one or more resource allocation issues occasioned by the conflicting information. For example, the NMM 522 can allocate additional ports existing and/or instantiated at one or more other access switches to provide sufficient ports for the two resource groups. Alternatively, the NMM 522 can resolve the conflicting configuration information by, for example, moving a portion of (or all) allocated ports for the first resource group and/or the second resource group to one or more other access switches. In this manner, the NMM 522 can ensure conformance with the updated configuration information by allocation and/or re-allocation of logical network resources across one or more physical network elements and/or devices.

The NMM 522 can send updated configuration information associated with a specific resource group and/or the Switch Fabric System 500 to the Configuration Database 570. The updated configuration information can also be included in the Signal 591 and can be based on the contents of the Signal 590. In some embodiments, the updated configuration information included in the Signal 591 can include a complete set of configuration settings for a portion of or all resources included in the Switch Fabric System 500. Alternatively, the updated configuration information can include only a portion of changes or edits to configuration information associated with a specific resource group and/or the Switch Fabric 500. Upon receipt of the Signal 591, the Configuration Database 570 can store the updated configuration information at a memory for later reference and/or use.

The NMM 522 can provide each NCE currently instantiated in the Switch Fabric System 500 with the updated configuration information described above. As shown in FIG. 5, the NMM 522 can send the Signals 591-593 to the NCEs 582, 584 and 586, respectively. Each of the Signals 591-593 can include at least a portion of the updated configuration information included in the Signal 590 as discussed above. Upon receipt of the updated configuration information, each of the NCEs 582, 584 and 586 can update a configuration file associated with a resource group or resource group portion with which that NCE is associated (e.g., the Resource Group 161 Configuration File 410 or the Resource Group 164 Configuration File 440 discussed in connection with FIG. 4). For example, upon receipt of the updated configuration information, the NCE 582 can update a configuration file associated with the Resource Group 561. In this manner, each such configuration file can be maintained in a current and accurate state by the NMM 522 and the NCEs 582, 584 and 586.

In some embodiments, the master configuration file described above can thus be programmatically and automatically updated, inasmuch as the master configuration file includes one or more references designed to dynamically include the contents of each configuration files associated with a resource group, VLAN, and/or other network resource included in the Switch Fabric System 500. In this manner, the master configuration file can be maintained in a current and accurate state by the NMM 522 and the NCEs 582, 584 and 586.

Figure 6:
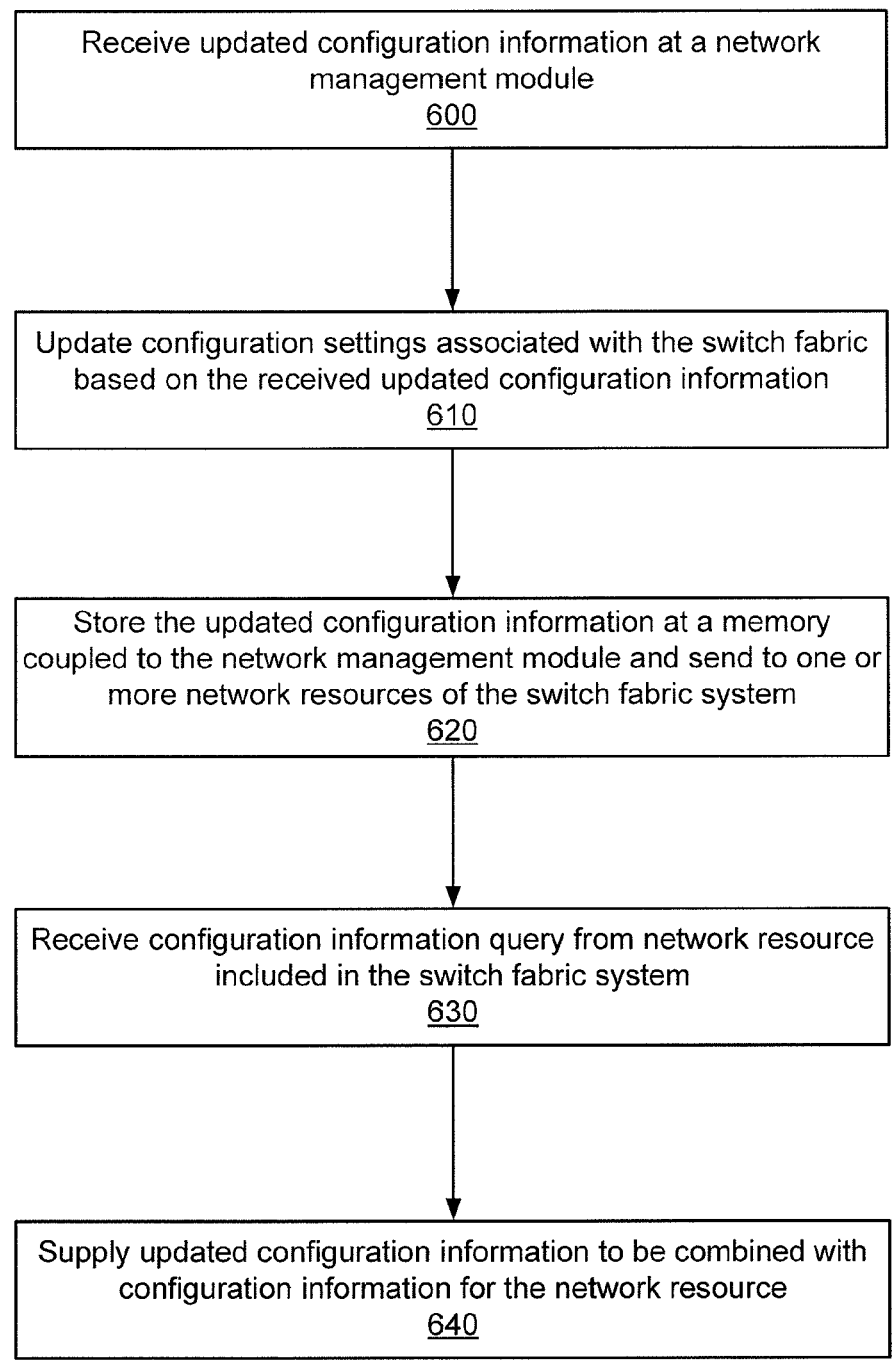
FIG. 6 is a flow chart that illustrates a method of supplying updated configuration information to one or more network resources, according to another embodiment.

FIG. 6 is a flow chart that illustrates a method of supplying updated configuration information to one or more network resources, according to another embodiment. A network management module ("NMM") can receive updated configuration information associated with one or more network resources included in a switch fabric system, at 600. The NMM can be any combination of hardware and/or software (executing in hardware) instantiated and/or present at a network device. For example, the NMM can be a software module instantiated and executing at a compute node of a switch fabric system. The NMM can be configured to manage elements and/or functionality of a control plane of the switch fabric system, including, for example, provisioning of network control entities, defining resource groups and/or VLANs, etc. The configuration information can be identity information, physical and/or logical address information, VLAN and/or resource group membership information, performance metric information, etc. The configuration information can be associated with one or more network resources included in the switch fabric system, such as configuration information associated with one or more interfaces (i.e., physical ports), NCEs, resource groups, VLANs, etc.

The NMM can update stored configuration information associated with the switch fabric system based on the updated configuration information (received at 600), at 610. For example, the NMM can update one or more configuration files associated with one or more network resources included in the switch fabric system. In some embodiments, the NMM can additionally change one or more settings or parameters of the NMM itself based on the updated configuration information.

The NMM can store the updated configuration information at a memory coupled to the NMM, at 620. For example, the NMM can send one or more signals or commands to a configuration database, the signals or commands configured to update one or more configuration records based on the updated configuration information. The configuration database can be, for example, a series of one or more files or records stored at a memory located at the same physical device as the network management module. The configuration database can alternatively be a relational or other database system physically located at a separate device operatively coupled to the device at which the network management module is instantiated. In some embodiments, the NMM can send one or more signals to one or more network resources, such as one or more NCEs. The signals can include at least a portion of the updated configuration information associated with that NCE and one or more network resources associated with that NCE. Accordingly, each recipient NCE can update one or more configuration files associated with a resource group and/or VLAN with which that NCE is associated or of which that NCE is a member.

The NMM can receive a configuration information query from a network resource included in the switch fabric system, at 630. For example, the NMM can receive a query from an NCE instantiated at an access switch of the switch fabric system. The query can be received via one or more data frames and/or data packets sent via one or more access switches of the switch fabric system and/or one or more switch devices, such as a multi-stage switch fabric. In some embodiments, the query can be formatted in one or more Extensible Markup Language (XML) queries or files.

Because the NCE already has access to configuration information associated with a resource group of which it is a member (per the step 620 described above), the query can include a request for information associated with another resource group or VLAN of which the NCE is not a member. Additionally or alternatively, the query can include a request for information associated with a higher-level in the switch fabric hierarchy, such as information associated with the entire switch fabric system, with the NMM itself, etc.

The NMM can supply updated configuration information to be combined with configuration information for the network resource, at 640. In some embodiments, the NMM can send one or more data frames and/or packets to the requesting network resource. The NMM can send the responsive data frames and/or packets via, for example, one or more access switches and/or switching devices of the switch fabric. Based on the responsive data frames and/or packets, the requesting network resource can perform one or more operations and/or make one or more configuration changes.

Figure 7:
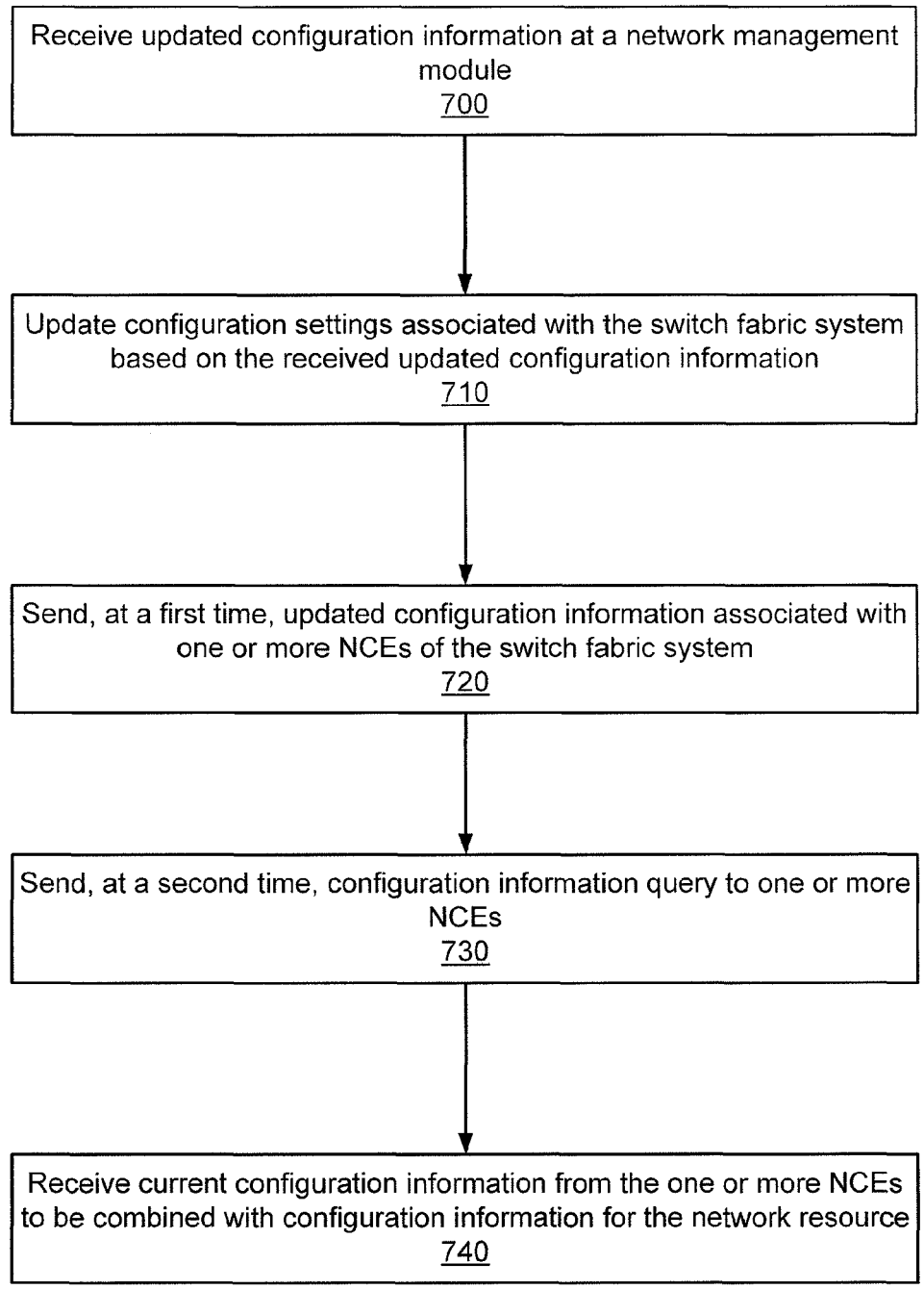
FIG. 7 is a flow chart that illustrates a method of querying one or more network resources for updated configuration information associated with those network resources, according to another embodiment.

FIG. 7 is a flow chart that illustrates a method of querying one or more network resources for updated configuration info' cation associated with those network resources, according to another embodiment.

A network management module ("NMM") associated with a switch fabric system can receive updated configuration information, at 700. The NMM can be a hardware-based module and/or software-based module (executing in hardware) located and/or instantiated at a compute node or other server node of the switch fabric system. The NMM can receive the updated configuration information via user input or from another network device. In some embodiments, the NMM can receive the updated configuration information via another network or via a remote link. The updated configuration information can be configuration information associated with one or more network resources of the switch fabric system, such as one or more NCEs, VLANs, resource groups, or other network resources. The configuration information can include, for example, identifier information, physical and/or logical address information, VLAN and/or resource group topology or hierarchy information, etc. The configuration information can further include network portion assignment information, port assignment information and peripheral processing device information. The network portion assignment information can include, for example, information sufficient to define the one or more resource groups or VLANs. The port assignment information can include, for example, association of one or more physical ports of the switch fabric system with one or more NCEs. The peripheral processing device information can include, for example, identifier, logical and/or physical address, storage capacity, and/or other information associated with one or more peripheral processing devices included in and/or operatively coupled to the switch fabric system.

Based on the updated configuration information (received at 700), the NMM can next update one or more configuration settings associated with the switch fabric system, at 710. For example, the NMM can update a logical address of an NCE instantiated at an access switch included in the switch fabric system. The NMM can also, for example, update one or more settings of the compute node at which it is instantiated.

The NMM can, at a first time, send updated configuration information associated with one or more NCEs of the switch fabric system, at 720. For example, the NMM can send a portion of the received configuration information to one or more NCEs included in the switch fabric system to which that portion of the configuration information pertains. The NMM can optionally send the portion of configuration information via one or more Border Gateway Protocol (BGP) packets and/or frames. Upon receipt of the portion of the configuration information, each NCE from the one or more NCEs can accordingly update a configuration file associated with a resource group of which that NCE is a member.

In some embodiments, a first network device (such as an access switch included in the switch fabric system) can send a first data frame and/or packet to a second network device included in the switch fabric system, based at least in part on the updated configuration information. For example, a first access switch can be included in a second resource group, the second resource group being included in a first resource group. Based at least in part on an updated identifier of the first resource group indicated by the updated configuration information, the first access switch can send a first data packet and/or frame to a second access switch included in the switch fabric system. The updated identifier can, for example, be included in a set of source information included in the first data packet and/or frame sent from the access switch.

The NMM can send, at a second time, a configuration information query to one or more NCEs of the switch fabric system, at 730. Because one or more configuration settings associated with the one or more NCEs may have changed since the first time, the NMM can maintain a current and accurate record of configuration information associated with each of the NCEs by regularly querying for the configuration information associated with that NCE. For example, the NMM can send, on a periodic basis, one or more BGP-formatted configuration queries to one or more NCEs instantiated at one or more access switches of the switch fabric system.

The NMM can receive current configuration information from the one or more NCEs, at 740. In some embodiments, the NMM can combine the received, current configuration information for the one or more NCEs with current configuration information of the switch fabric system to generate a complete record of configuration information for every network resource included in the switch fabric system. In some embodiments, the NMM can combine the information within a single, hierarchical configuration file such as the Switch Fabric Configuration File 401 discussed in connection with FIG. 4 above.

In some embodiments, the first network device (such as the first access switch described above) can send a second data frame and/or packet to the second network device included in the switch fabric system, based at least in part on a change to the configuration information associated with the first resource group. For example, the first access switch can send a second data packet and/or frame to the second access switch included in the switch fabric system. The second data packet and/or frame can, for example, be routed to the second access switch based at least in part on the change to configuration information associated with the first resource group, such as a change to an identifier of the first resource group, an altered configuration of access switches and/or ports included in the first resource group, etc.

Figure 8:
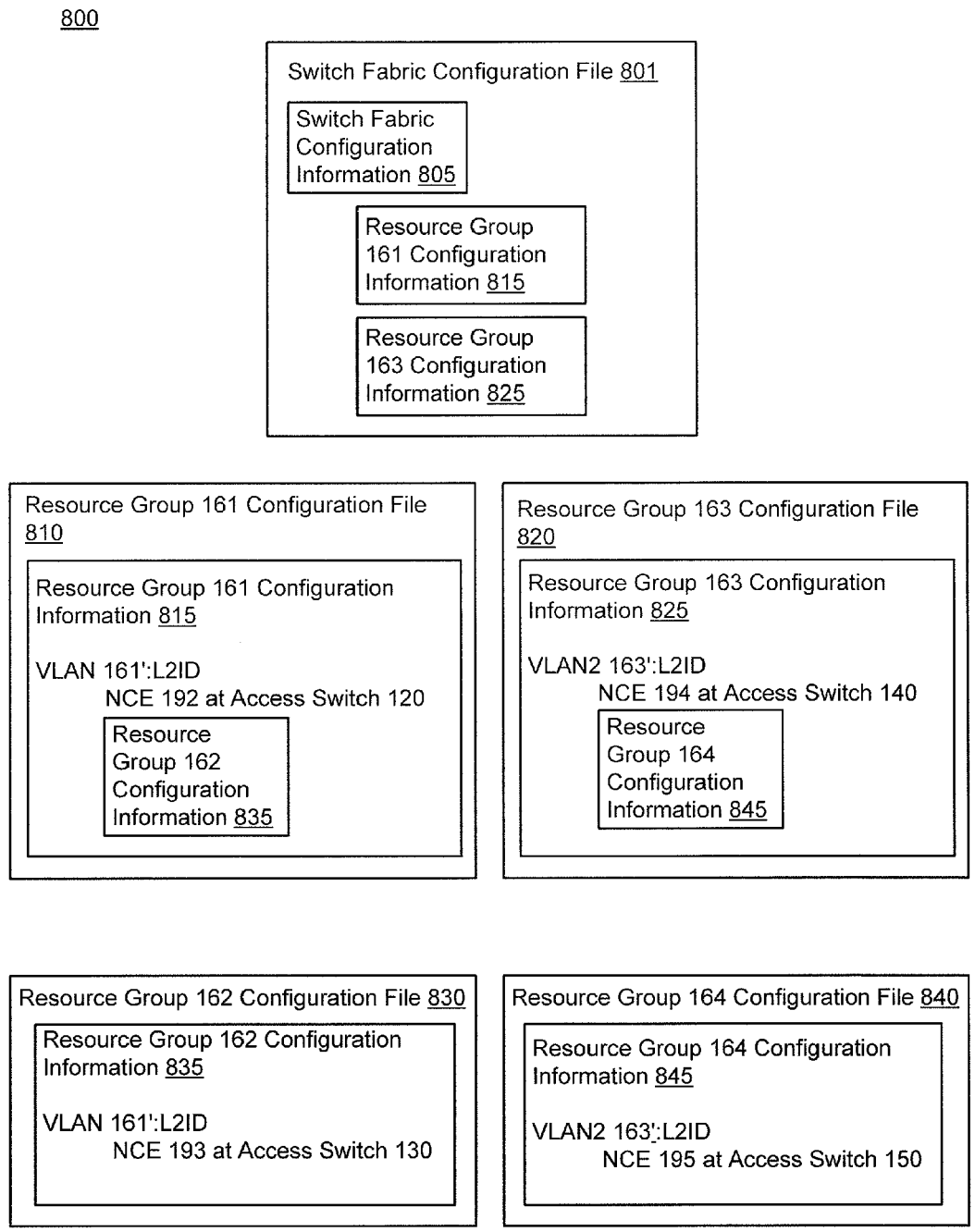
FIG. 8 is a diagram of a set of configuration files for a switch fabric system and multiple resource groups and VLANs of the switch fabric system, according to another embodiment.

FIG. 8 is a diagram of a set of configuration files associated with a switch fabric system and multiple resource groups, according to another embodiment. More specifically, FIG. 8 illustrates a Set of Configuration Files 800 that includes a Switch Fabric Configuration File 801 and Resource Group Configuration Files 810, 820, 830 and 840. The Switch Fabric Configuration File 801 includes Switch Fabric Configuration Information 805, Resource Group 161 Configuration Information 815 and Resource Group 163 Configuration Information 825. Resource Group Configuration File 810 includes Resource Group 161 Configuration Information 815, which includes configuration information associated with the Resource Group 161 and Resource Group 162 Configuration Information 835. Resource Group 163 Configuration File 820 includes Resource Group 163 Configuration Information 825, which includes configuration information associated with the Resource Group 163 and Resource Group 164 Configuration Information 845. Resource Group Configuration File 830 includes Resource Group 162 Configuration Information 835, which includes information associated with the Resource Group 162. Resource Group Configuration File 840 includes Resource Group 164 Configuration Information 845, which includes information associated with the Resource Group 164.

In some embodiments, the Switch Fabric Configuration Information 805 included in the Switch Fabric Configuration File 801 can include configuration information associated with a switch fabric system, such as the Switch Fabric System 100 discussed in connection with FIG. 1 above. The Switch Fabric Configuration Information 805 can include, for example, a list, hierarchy or topology of one or more VLANs and/or resource groups defined within a switch fabric system. The list, hierarchy or topology can optionally include identifier, logical and/or physical address, physical location and/or other information associated with the one or more VLANs and/or resource groups. In some embodiments, the Switch Fabric Configuration Information 805 can include information associated with a total number of network resources included in a switch fabric system. This information could include, for example, a total number of each type of network resource included in the switch fabric system. The Switch Fabric Configuration Information 805 can also include performance metrics associated with a switch fabric, such as a number of packets and/or frames sent within a given time period, an average number of packets and/or frames sent, a total and/or average of dropped packets and/or frames, sent within the switch fabric system, etc. The Switch Fabric Configuration Information 805 can further include network portion assignment information, port assignment information and peripheral processing device information. The network portion assignment information can include, for example, information sufficient to define the one or more resource groups or VLANs. The port assignment information can include, for example, association of one or more physical ports of the switch fabric system with one or more NCEs. The peripheral processing device information can include, for example, identifier, logical and/or physical address, storage capacity, and/or other information associated with one or more peripheral processing devices included in and/or operatively coupled to the switch fabric system.

The Resource Group 161 Configuration Information 815 can include information associated with a set of network resources included in the Resource Group 161 (similar to the Resource Group 161 discussed in connection with FIG. 1 above). This information can include, for example, information associated with one or more VLANs of which one or more network resources included in the Resource Group 161 is a part, such as the VLAN 161'. The VLAN information can include a VLAN identifier and/or other VLAN configuration information.

The Resource Group 161 Configuration Information 815 can further include configuration information associated with the one or more network resources included in both the Resource Group 161 and the VLAN 161'. For example, the one or more network resources can include the NCE 192 instantiated at the Access Switch 120. As shown in FIG. 8, configuration information associated with the NCE 192 can include an identifier of the NCE 192. This identifier of the NCE 192 can be based at least in part on an identifier of the Resource Group 161 and an identifier of the VLAN 161', such as a name of the Resource Group 161 and a layer-2 identifier of the VLAN 161'. For example, the identifier of the NCE 192 can include a prepended identifier portion corresponding to a name of the Resource Group 161 and an identifier of the VLAN 161', followed by a logical and/or physical address of the NCE 192. In this manner, the identifier of the NCE 192 can be globally unique across the switch fabric system. In some embodiments, each network resource included in the Resource Group 161 can have an identifier including the prepended identifier portion corresponding to the name of the Resource Group 161 and the identifier of the VLAN 161'. In this manner, each network resource included in the Resource Group 161' can be globally unique and distinguishable across the switch fabric system.

The Resource Group 161 Configuration Information 815 can also include the Resource Group 162 Configuration Information 835. The Resource Group 162 Configuration Information 835 can include information associated with a set of network resources included in the Resource Group 162 (discussed in connection with FIG. 1 above). This information can include, for example, information associated with the VLAN 161', inasmuch as one or more network resources included in the Resource Group 162 is included in the VLAN 161'. The VLAN information can be similar to the VLAN information described in connection with the Resource Group 161 Configuration Information 815 above. As shown in FIG. 1, the Resource Group 162 can be a subset of network resources included in the Resource Group 161. As such, as shown in FIG. 8, the Resource Group 162 Configuration Information 835 can be included in the Resource Group 161 Configuration Information 815, and each network resource from the Resource Group 162 can have a network identifier including a prepended identifier portion specifying both a name of the Resource Group 162 and an identifier of the VLAN 161' (in which that network resource is included). In this manner, each network resource included in the Resource Group 162 can be globally identifiable across the switch fabric system.

As shown in FIG. 8, the Set of Configuration Files 800 can also include the Resource Group 161 Configuration File 810. The Resource Group 161 Configuration File 810 can include the Resource Group 161 Configuration Information 815 described above, which can include the Resource Group 162 Configuration Information 835 also described above. The Resource Group 162 Configuration file 830 can also include the Resource Group 162 Configuration Information 835. Although not discussed in further detail herein, as shown in FIG. 8, the Resource Group 163 Configuration Information 825 can include similar information associated with the one or more network resources included in the Resource Group 163 within the switch fabric system.

As is clear from the various levels of information encapsulation present within the Switch Fabric Configuration File 801, the Resource Group 161 Configuration File 810 and the Resource Group 162 Configuration File 830, the Set of Configuration Files 800 includes a hierarchical arrangement of configuration information associated with a switch fabric system. Thus, reference to a configuration file for a particular hierarchical level within the switch fabric (such as at the switch fabric or resource group level) includes reference to configuration information associated with each network resource included at any level within the particular switch fabric or resource group. This inheritance thus allows for more efficient storage of switch fabric resource configuration information, avoiding the need to store and/or record configuration information for a particular network resource in more than one configuration file and/or physical memory storage location.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using Java, C++, or other programming languages (e.g., object-oriented programming languages) and development tools. Additional examples of computer code include, but are not limited to, control signals, encrypted code, and compressed code.

While various embodiments have been described above, it should be understood that they have been presented by way of example only, not limitation, and various changes in form and details may be made. Any portion of the apparatus and/or methods described herein may be combined in any combination, except mutually exclusive combinations. The embodiments described herein can include various combinations and/or sub-combinations of the functions, components and/or features of the different embodiments described. For example, in some embodiments an access switch and a peripheral processing device in a switch fabric can be included in a single hardware device or module.

What is claimed is:

1. An apparatus, comprising:
a processor of a network device that is operatively coupled to a switch fabric, the processor configured to execute a network management module; and
the network management module configured to store a first set of configuration information associated with a first set of network resources, the first set of network resources being a subset of a second set of network resources, the second set of network resources being included in a virtual local area network from a plurality of virtual local area networks, the plurality of virtual local area networks being defined within the switch fabric,
the first set of configuration information dynamically including at least a second set of configuration information associated with each network resource from the second set of network resources, the first set of configuration information including configuration information not included in the second set of configuration information.

2. The apparatus of claim 1, wherein the network management module is configured to send the first set of configuration information to at least one network resource from the first set of network resources, the at least one network resource hosted at an access switch operatively coupled to a data plane portion of the switch fabric.

3. The apparatus of claim 1, wherein the network management module and at least one network resource from the second set of network resources are configured to execute at a single physical device, the at least one network resource being a network control entity within a control plane of the switch fabric.

4. The apparatus of claim 1, wherein the network management module is configured to receive the second set of configuration information in an Extensible Markup Language (XML) file.

5. The apparatus of claim 1, wherein each network resource included in the second set of network resources is a network control entity within a control plane of the switch fabric and configured to execute at one of:
an access switch operatively coupled to the switch fabric; or
a compute node device operatively coupled to the switch fabric.

6. A method, comprising:
executing, by a processor of a network device that is operatively coupled to a switch fabric, a network management module;
storing, by the network management module, a first set of configuration information associated with a first set of network resources, the first set of network resources being a subset of a second set of network resources, the second set of network resources being included in a virtual local area network from a plurality of virtual local area networks, the plurality of virtual local area networks being defined within the switch fabric,
the first set of configuration information dynamically including at least a second set of configuration information associated with each network resource from the second set of network resources, the first set of configuration information including configuration information not included in the second set of configuration information.

7. The method of claim 6, further comprising sending, by the network management module, the first set of configuration information to at least one network resource from the first set of network resources, the at least one network resource hosted at an access switch operatively coupled to a data plane portion of the switch fabric.

8. The method of claim 6, wherein the network management module and at least one network resource from the second set of network resources are configured to execute at a single physical device, the at least one network resource being a network control entity within a control plane of the switch fabric.

9. The method of claim 6, further comprising receiving, by the network management module, the second set of configuration information in an Extensible Markup Language (XML) file.

10. The method of claim 6, wherein each network resource included in the second set of network resources is a network control entity within a control plane of the switch fabric and configured to execute at one of:
an access switch operatively coupled to the switch fabric; or
a compute node device operatively coupled to the switch fabric.

* * * * *